(12) United States Patent
Kadyk et al.

(10) Patent No.: US 6,996,841 B2
(45) Date of Patent: Feb. 7, 2006

(54) NEGOTIATING SECURE CONNECTIONS THROUGH A PROXY SERVER

(75) Inventors: Donald J. Kadyk, Bothell, WA (US); Neil S. Fishman, Bothell, WA (US); Marc E. Seinfeld, Kenmore, WA (US); Michael Kramer, Yonkers, NY (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 09/838,745

(22) Filed: Apr. 19, 2001

(65) Prior Publication Data

US 2002/0157019 A1 Oct. 24, 2002

(51) Int. Cl.
*H04L 9/00* (2006.01)
(52) U.S. Cl. ........... 726/12; 726/3; 726/5; 713/150; 713/156
(58) Field of Classification Search .......... 713/171, 713/201, 153, 150, 182, 156, 151, 152; 380/278, 380/281, 283; 709/225, 203, 230, 241, 200, 709/249, 229; 726/12, 15, 3, 5
See application file for complete search history.

(56) References Cited

U.S. PATENT DOCUMENTS 6,584,567 B1 * 6/2003 Bellwood et al. ........... 713/171

OTHER PUBLICATIONS

Stallings, Cryptography and network security, 2nd Edition, pp. 144.*

Network World, on the q.t Unipress Software's MAILguardian gets our vote for best e-mail encryption and autehntication of product for your internet, Nov. 30, 1998.*
Luotonen, Ari, "Tunneling SSL Through a WWW Proxy", Dec. 14, 1995.
Kent S. et al., "RFC 2401—Security Architecture for the Internet Protocol", Nov. 1998.
Luotonen, Ari, "Web Proxy Servers", 1997, pp. 54-59, 148-151, 338-341.
MacGregor, S. et al, "WWW.Security", 1996, pp. 9-10, 30-33, 47-64.
Franks, J. et al, W3C, HTTP Authentication: Basic and Digest Access Authentication, RFC 2617,1999.

* cited by examiner

*Primary Examiner*—Hesuk Song
*Assistant Examiner*—Paula Klimach
(74) *Attorney, Agent, or Firm*—Workman Nydegger

(57) ABSTRACT

Methods, systems, and computer program products for negotiating a secure end-to-end connection using a proxy server as an intermediary. The client first negotiates a secure connection between the client and the proxy so that any credentials exchanged will be encrypted. After the exchange of authentication credentials, the secure client-proxy connection is altered so that no further encryption takes place. The client and server then negotiate a secure end-to-end connection through the proxy, with the secure end-to-end connection being encapsulated within the insecure client-proxy connection. In this way, the overhead of creating a separate client-proxy connection for the secure end-to-end connection may be avoided, but the insecure client-proxy connection introduces only minimal overhead because it no longer encrypts any data that it carries.

60 Claims, 9 Drawing Sheets

NEGOTIATING SECURE CONNECTIONS THROUGH A PROXY SERVER

BACKGROUND OF THE INVENTION

1. The Field of the Invention

The present invention relates to secure data communication over a computer network. More specifically, the present invention relates to methods, systems, and computer program products for negotiating a secure end-to-end connection using a proxy server as an intermediary.

2. Background and Related Art

Data security over computer networks generally involves two separate considerations: (i) controlling access to the data source or server and (ii) insuring that the data is not intercepted or altered as the data travels through the network. For small private networks, data interception and/or alteration are of minimal concern because the networks are easily secured in a physical sense. For example, it is unlikely that an unauthorized person would be able to enter a home, make a connection to a computer network linking two personal computers, and intercept data exchanged between the two computers, all without being detected by the homeowner. In contrast, data transmitted over a public network, such as the Internet, may be intercepted and/or altered with relatively minor efforts. Due to the world-wide distances covered by the Internet and the virtually innumerable points of access, an unauthorized person could monitor various transactions between two computers and never be detected.

As a result, encryption techniques have been developed to insure that data exchanged over insecure networks may not be altered or deciphered in the event it is intercepted. One common technique is the use of asymmetric public/private key pairs. Only the private key is able to decrypt data encrypted with the public key and only the public key is able to decrypt data encrypted with the private key. Using the public and private keys, two computers generate secret symmetric encryption keys that are then used to encode any data exchanged between the computers. If an eavesdropper intercepts the data as it moves between computers, the information remains confidential because the eavesdropper does not know what the symmetric encryption keys are and is therefore unable to decrypt any intercepted data.

However, protecting data as it travels through a network only solves one of the problems identified above. Access to the data source or server also must be protected. Otherwise, even though intercepted data does not expose confidential information, a potential intruder simply may access the data source directly. Usernames and passwords are well-known tools for limiting access to data sources.

When one computer accesses another computer directly, the security measures described above are relatively straightforward. After establishing a secure connection to encrypt any data exchanged between the computers, usernames and passwords may be transmitted without concern because if they are intercepted, an eavesdropper will only see them in an encrypted form and will be unable to decipher them. However, the use of proxy servers requiring indirect connections between computers complicates the implementation of these security measures.

As an example, consider the authentication offered by the hypertext transfer protocol ("HTTP"). HTTP provides for authentication of a client computer to both proxy servers ("proxies") and Web servers ("servers") or data sources. Using authenticate challenges, proxies and servers are able to obtain credentials from client computers to insure that the client computers are authorized to use their resources. Authentication protects against unauthorized access, but, as explained above, unauthorized access is only one part of the problem. Without encryption, an eavesdropper may intercept a client's credentials and use them to gain direct access to a server or proxy. However, in an environment that includes proxies and servers, prior art encryption options may prove to be inadequate.

As the name implies, proxies operate on behalf of another computer, usually a client. When a client issues a request, the request is passed to the proxy and then the proxy makes the request as if the proxy were the client. The proxy directs any responses to the request back to the requesting client. Although proxy and client work in a cooperative fashion, this does not mean that the client is willing to share the details of a request with the proxy. For example, a client may access a server in order to execute various financial transactions such as trading stocks or paying bills. While the client is willing to supply the appropriate account numbers and corresponding credentials to the server, the client does not necessarily want the proxy to have this information.

To more fully appreciate the dilemma, imagine being in the position of needing to deposit a paycheck, but not having time to perform the task personally. One solution might be to ask a coworker to make the deposit for you. You give the coworker your paycheck, a deposit slip, and instructions to deposit the check in your account. The coworker goes to the bank, deposits the check, and brings you back the deposit receipt. In performing this task, the coworker has learned the amount of your paycheck, your bank account number, and possibly your account balance. Now, it is not that you do not trust your coworker, but you would have preferred to maintain that information confidential.

After a little more thought, you decide to put the paycheck in a container that can be opened only by you and the bank. You also include a sheet of instructions for the bank to (i) deposit your check, (ii) place the deposit receipt in the container, (iii) close the container, and (iv) give the container back to your coworker. The coworker brings you the container. By using the container, you have accomplished your task and kept the details of the transaction from being disclosed to your coworker.

Proxy servers implement an analogous feature called tunneling. In tunneling, the proxy receives an encrypted message from the client that is addressed to a server. Only the server and client are able to decrypt the message. Operating on behalf of the client, the proxy forwards the encrypted message to the server. Upon receipt, the server decrypts the message, performs the task described in the message, encrypts the results from having performed the task, and sends the encrypted results back to the proxy. The proxy recognizes that the results are intended for the client and forwards the encrypted results to the client, where they can be decrypted and acted upon if necessary. As in the coworker example, the client accomplishes the desired task without disclosing any confidential information to the proxy.

Taking the analogy one step further, suppose that you leave the container on your coworker's desk with instructions that the container be taken to the bank. You coworker is a nice person, but is unwilling to perform this favor for just anyone. As a result, the coworker calls you and verifies that you are in fact the person making the request. Once satisfied that you are who you say you are and that the container is from you, the coworker performs the task as requested. Similarly, proxy servers may require authentication before acting on the client's behalf.

The problem with proxy authentication as taught in the prior art is that, while tunneled communication between the client and server is encrypted, direct communication between the client and proxy is not. Therefore, an eavesdropper may intercept authentication credentials passed between the client and proxy. After obtaining proper authentication credentials, the eavesdropper may instruct the proxy to act on the eavesdropper's behalf, as if the eavesdropper were the client. Gaining proxy authentication credentials represents a significant security breach because the proxy unwittingly may allow the eavesdropper to gain further information through accessing other network resources available to the proxy.

SUMMARY OF THE INVENTION

These and other problems with the prior art are overcome by the present invention, which is directed toward negotiating a secure end-to-end connection using a proxy server as an intermediary. As taught in the prior state of the art, creating a secure end-to-end connection, between a server and a client, that passes through an intermediary does not provide any security benefits to direct communication between the client and the proxy. Therefore, any credentials exchanged between the client and proxy during a proxy authentication may be intercepted and compromised.

Tunneling protocols allow clients and servers to establish secure end-to-end connections with proxy servers acting as intermediaries. When a proxy receives a request for a secure end-to-end connection, the proxy forwards the request on to the destination server and then acts as a transparent byte forwarder. The proxy suspends most other operations, such as examining content for potential security risks, because nearly all data passing through the proxy is encrypted. Only necessary address information for routing the data is unencrypted and may be examined, by the proxy.

According to the present invention, a proxy receives a request for a secure connection between a client and the proxy. The proxy honors the request and establishes a secure client-proxy connection. The secure connection allows the client and the proxy to exchange information without concern that the information may be intercepted. An eavesdropper examining the data traveling between the client and proxy will only see encrypted information that cannot be deciphered. The proxy then receives a request from the client for a secure end-to-end connection with a server, the connection being tunneled through the proxy. The client authenticates itself using a certificate exchanged in establishing the secure client-proxy connection; otherwise, prior to forwarding the request on to the server, the proxy issues a proxy authenticate challenge to the client system. Similarly, the proxy may authenticate itself to the client with a certificate. This insures that the client system is authorized to use the proxy server and verifies the identity of the proxy server. By having established a secure connection between the client and the proxy, any credentials passed in the client's response to the proxy authenticate challenge are encrypted and therefore may not be comprised.

Once the proxy receives the proper credentials from the client, the proxy forwards the request for a secure end-to-end connection to the server. The additional layer of protection provided by the secure client-proxy connection is now redundant and the proxy downgrades the connection so that it is no longer encrypted. The client and server encrypt all data they exchange through the tunnel, and one level of encryption is sufficient. From this point on, the proxy simply forwards data from the client to the server and data from the server to client. The resulting secure end-to-end connection between the client and the server is encapsulated within the insecure client-proxy connection. However, because the insecure client-proxy connection does not perform any encryption or decryption of the data it carries, only minimal overhead on communication between the client and server is introduced by the encapsulation.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIGS. 2A–1 and 2A–2 show the operation of a Web server in challenging a client for authentication;

FIGS. 2B–1 and 2B–2 show the operation of a proxy server in challenging a client for authentication;

DETAILED DESCRIPTION OF THE INVENTION

Figure 1:
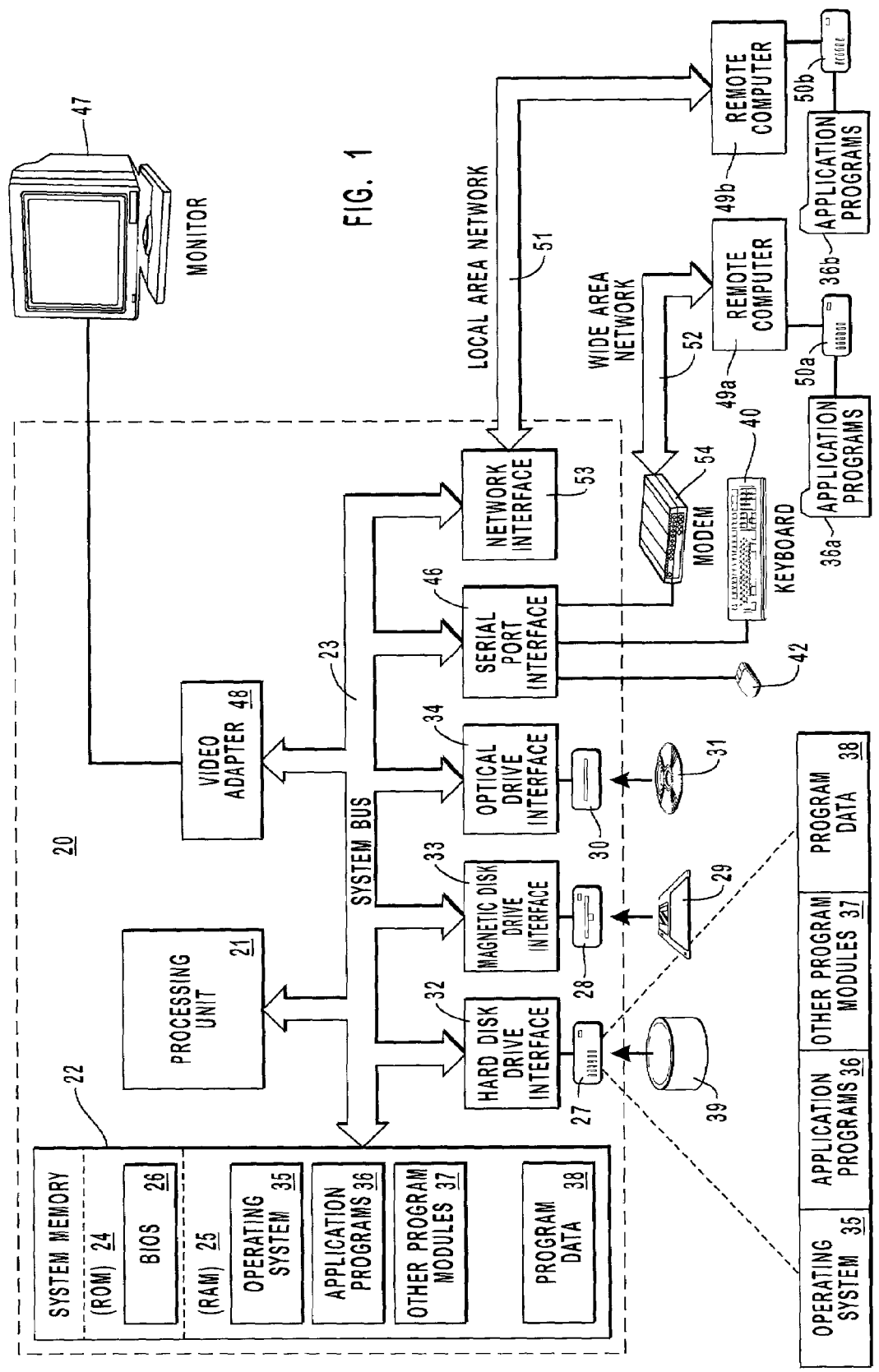
FIG. 1 illustrates an exemplary system that provides a suitable operating environment for the present invention.

Web servers ("servers") and proxy servers ("proxies") may require client authentication before allowing access to the resources they provide. In general, a client is a requester of resources, a server is a provider of resources, and a proxy is an intermediary, operating on behalf of clients and/or servers as directed. Those of skill in the art will recognize that the operations of client, server, and proxy are not mutually exclusive and often depend on perspective. In other words, "client," "server," and "proxy," typically identify a role being played at a particular time, rather than naming an immutable characteristic. Therefore, as used in this application, the terms "client," "server," and "proxy" should be interpreted broadly to encompass the dynamic nature of these entities, recognizing that irrespective of the usual role for a given entity, (i) a server may operate as either a client or proxy, (ii) a proxy may operate as either a server or a client, and (iii) a client may operate as either a server or a proxy.

The Hypertext Transfer Protocol ("HTTP") specification identifies two authentication mechanisms, basic and digest. Both mechanisms follow a challenge/response model. Using basic authentication, a server or proxy denies a client's request for a resource until a username and password are provided. The username and password are encoded into a base 64 string, meaning that they are transmitted as cleartext for all practical purposes. Because exchanging username and password as cleartext allows them to be compromised easily, basic authentication cannot be considered a secure authentication mechanism.

Digest authentication is significantly more secure than basic authentication, but when measured against modern data encryption techniques, digest authentication is comparatively weak. A server or proxy implementing digest authentication challenges a client with a nonce value. In response, the client provides a digest of (i) a username, (ii) a password, (iii) the nonce value provided in the challenge, (iv) the HTTP method used in the initial request, and (v) the resource identifier requested by the client. Typically, the digest comprises 128 bits represented as 32 ACSII printable characters generated by the MD5 algorithm. Although vastly superior to basic authentication, digest authentication is also an insecure authentication mechanism.

Neither basic nor digest authentication provide any significant security for data that is transmitted between a server or proxy and a client. The data may be read by eavesdroppers and potentially altered. Furthermore, basic and digest authentication are incapable of authenticating servers and proxies to clients, making both mechanisms susceptible to man-in-the-middle attacks. In order to provide for secure authentication and data exchanges, a security system external to HTTP, such as secure sockets layer ("SSL") or transport layer security ("TLS") may be used on conjunction with basic and digest authentication. SSL and TLS also provide for certificate-based client authentication, but most clients/users have not implemented and/or have not obtained a certificate for purposes of client authentication.

The use of proxy servers may reduce the effectiveness of combining SSL with basic or digest security because the protections of SSL are only available when the end-to-end connection between client and server has been established. In many circumstances, a proxy will require either basic or digest authentication of the client prior to setting up an SSL connection between the client and server. Without the benefits of an SSL connection, the basic or digest authentication is vulnerable to attack.

Although proxies generally operate on behalf of clients (forward proxies), proxies also may operate on behalf of servers (reverse proxies). A forward proxy provides a protocol, known as SSL tunneling, that allows the proxy to operate as a transparent byte forwarder. The proxy is only able to examine where data should be sent (either host or client). All other information is encrypted. Nevertheless, the proxy may issue an authentication challenge prior to setting up the SSL connection and in doing so, expose basic or digest passwords.

Reverse proxies operating on behalf of servers appear to be the source of content. A reverse proxy receives requests for content from clients, retrieves the content from a server that is in fact the source of content, and provides the content to the client as if the reverse proxy were the content's source. SSL tunneling is not possible for reverse proxies because the client only knows of the proxy. Secure communication between client and server is therefore divided into two SSL connections: (1) a secure connection between client and proxy and (2) a secure connection between proxy and server. To the server, the proxy appears as a client, and to the client, the proxy appears as a server. The two SSL connections are separate and unrelated to each other, meaning that separate encryption is used for each connection.

Although a proxy may allow for an SSL connection to be established between the client and the proxy before requiring authentication, a proxy requiring authentication is unlikely to operate on the client's behalf until the client is authenticated. In reverse proxy operation, this allows the SSL connection to be established first, followed by an authentication challenge. Once the client is authenticated, the reverse proxy retrieves and delivers the requested content. However, a forward proxy must authenticate prior to establishing an SSL tunnel to the server because after the SSL connection with the server exists, the proxy's only function is to forward bytes between client and server. Therefore, the proxy's only opportunity to authenticate the client occurs when the client requests an SSL connection to the server, leaving hostname, port, and basic or digest passwords exposed because no SSL connection has been formed.

To solve this problem in accordance with the present invention, the client first establishes a secure connection with the proxy. To prove or verify its identity, the proxy may provide a certificate to the client. Once the secure connection is in place, the client initiates a secure connection with the server. The proxy then challenges the client for authentication and the client responds with the proper credentials. Because of the secure connection between the client and the proxy, basic or digest passwords along with the hostname and port of the server are encrypted. Alternatively, the client may authenticate with a certificate while establishing a secure connection with the proxy. Once the authentication between client and proxy is completed, the proxy downgrades the client-proxy connection to be insecure by selecting a null cipher. With a secure connection between the client and the server, the server similarly may require authentication without risking interception of the basic or digest passwords that are exchanged. As with the proxy, the client may authenticate with a certificate while establishing a secure connection with the server. As a result, the secure client-server connection is encapsulated within the client-proxy connection, but the client-proxy connection introduces only minimal overhead because no encryption takes place. The present invention extends to methods and computer program products for negotiating a secure end-to-end connection using a proxy server as an intermediary. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figures 1, 2A:
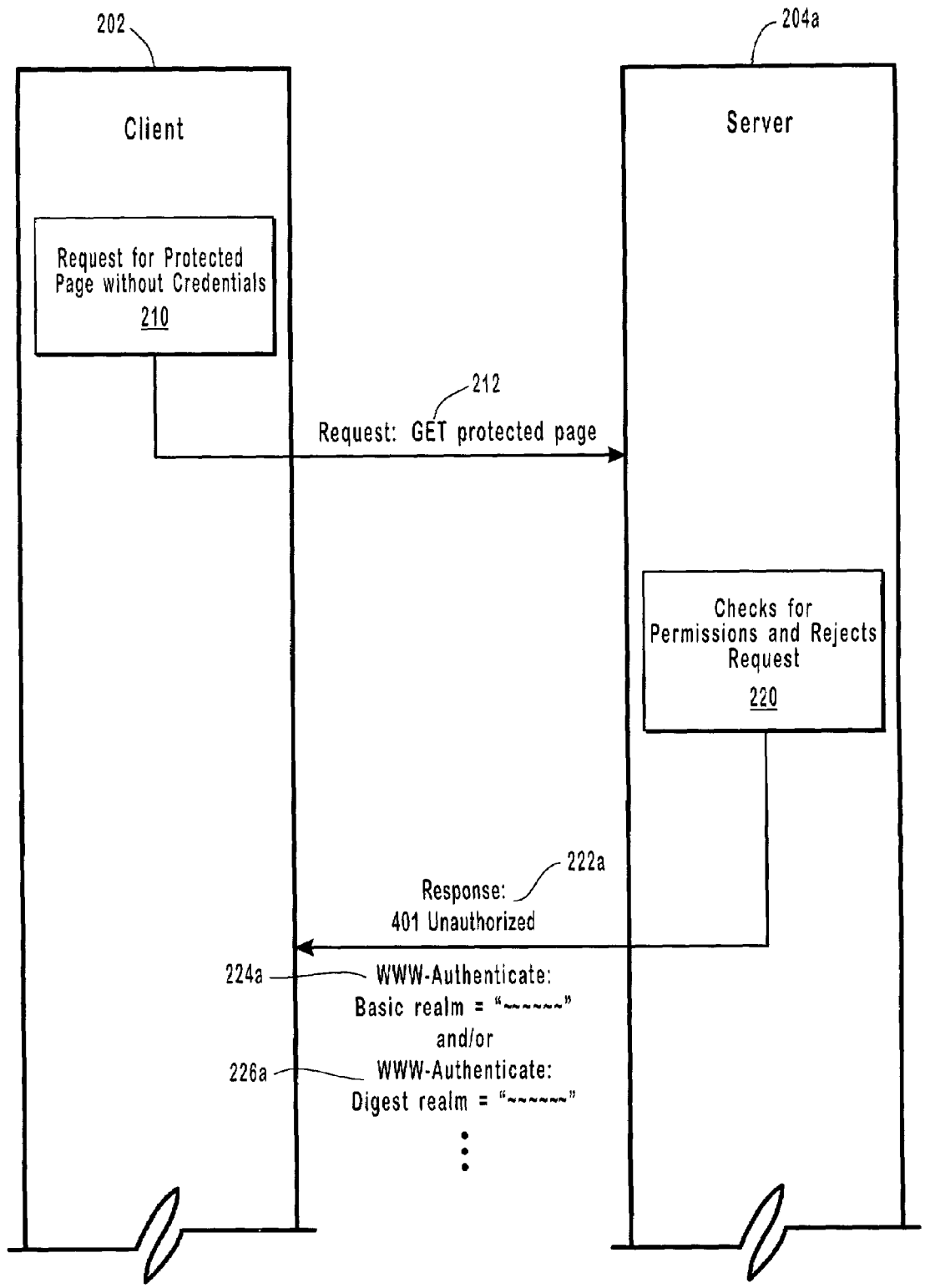
Figures 2, 2A:
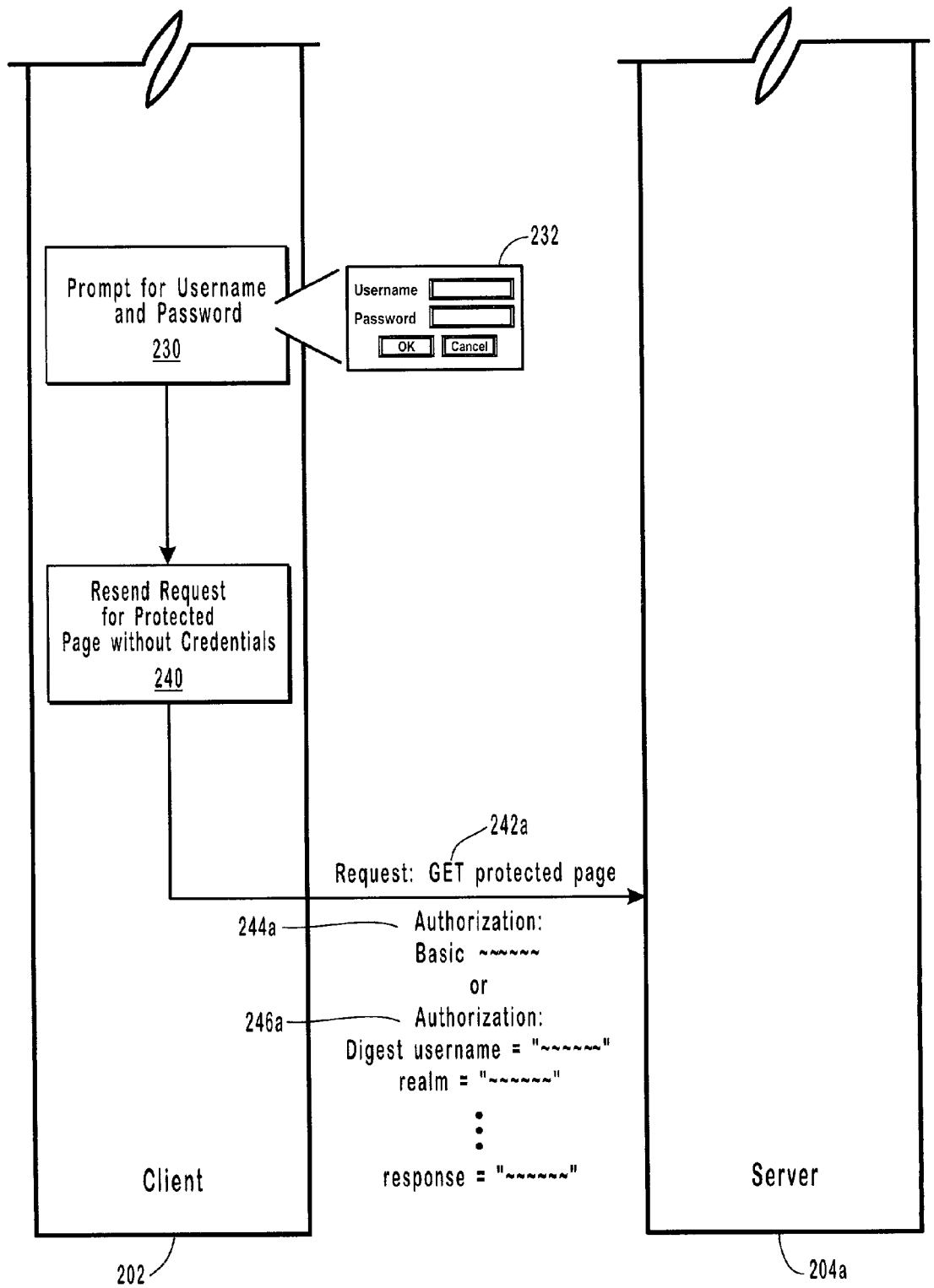

FIGS. 2A–1 and 2A–2 show the operation of a Web server system 204a in challenging a client system 202 for authentication. At reference 210, client 202 requests 212 a protected page from server 204a without providing the necessary credentials. The protected page represents any type of data that may be available at server 204a, such as documents, email, databases, etc. When server 204a receives request 212 for the protected page, server 204a checks the permissions required for the page and rejects (220) request 212 because the proper credentials were not included with the request. The response 222a to request 212 includes a status code and text indicating that access is unauthorized. For servers, the value of the status code is 401. HTTP headers 224a and 226a specify the type of authentication required. Either or both of header 224a and header 226a will be included with response 222a, depending on the type of authentication supported by server 204a. For server authentication, headers 224a and 226a are "WWW-Authenticate:" headers. The basic directive of header 224a specifies that basic authentication is required for resources included in the server-defined realm that is also part of header 224a. Likewise, the digest directive of header 226a specifies that digest authentication is required for resources included in the server-defined realm identified in header 226a. The ellipses in header 226a represent other directives that are typically included with header 226a that have been omitted for clarity.

After receiving response 222a, as illustrated at reference 230 of FIGS. 2A–2, client 202 prompts 232 for username and password. The realm and name for server 204a generally are included with the prompt, although they are not shown with prompt 232. Having obtained the required credentials, at reference 240 the client is prepared to resend the request for the protected page, but this time the request 242a will include the server authenticate credentials with the request. Usually, only one of either HTTP header 244a or header 246a will be included with request 242a, depending on the type of authentication supported by client 202 and server 204a. For server authentication, headers 244a and 246a are "Authorization:" headers. The basic directive indicates that basic authorization follows the directive. Similarly, the digest directive indicates that digest authorization is being supplied for the username in the server-defined realm identified in header 246a. The ellipses in header 226a represent other directives that are typically included with header 226a that have been omitted for clarity.

Figures 1, 2B:
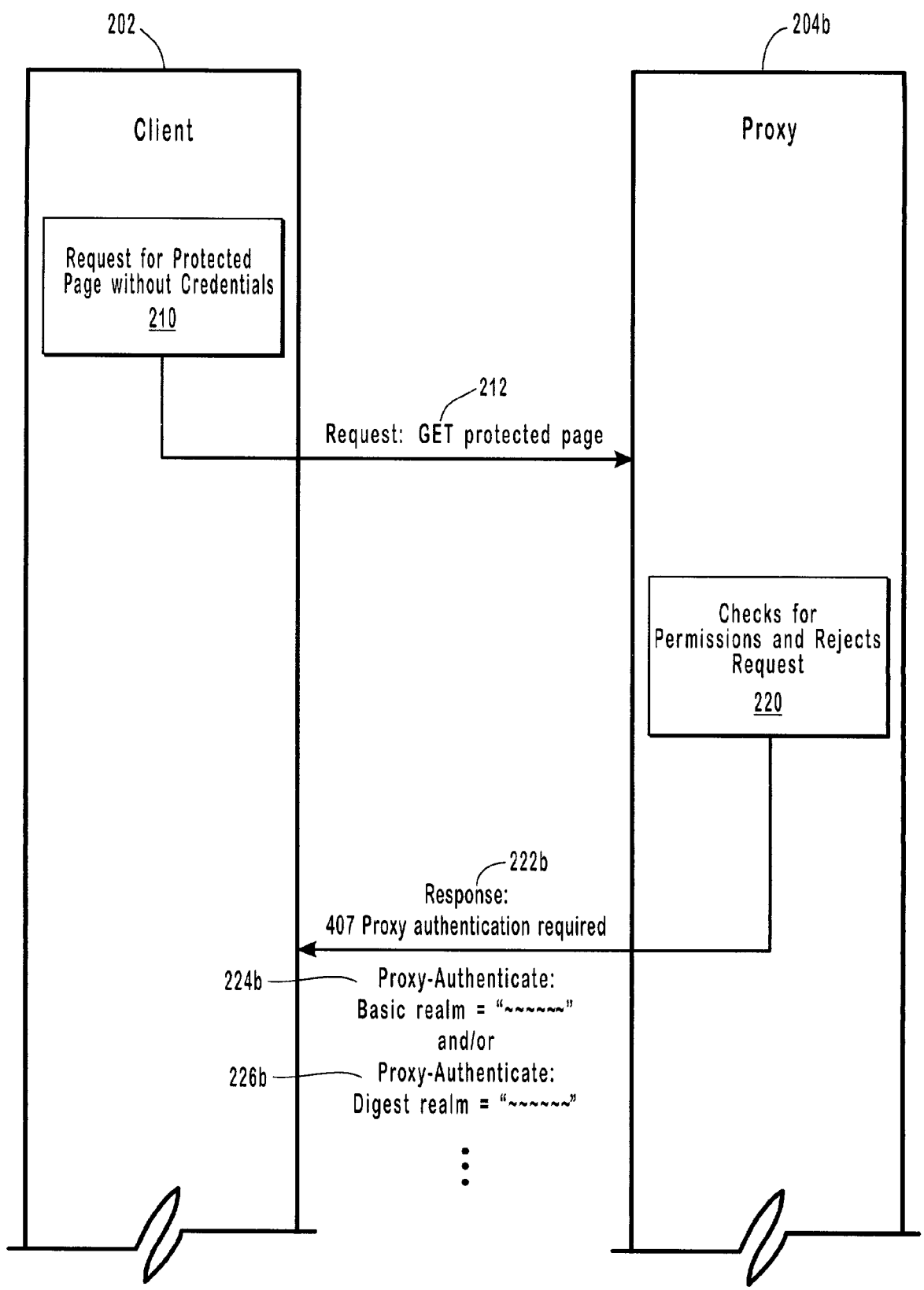
Figures 2, 2B:
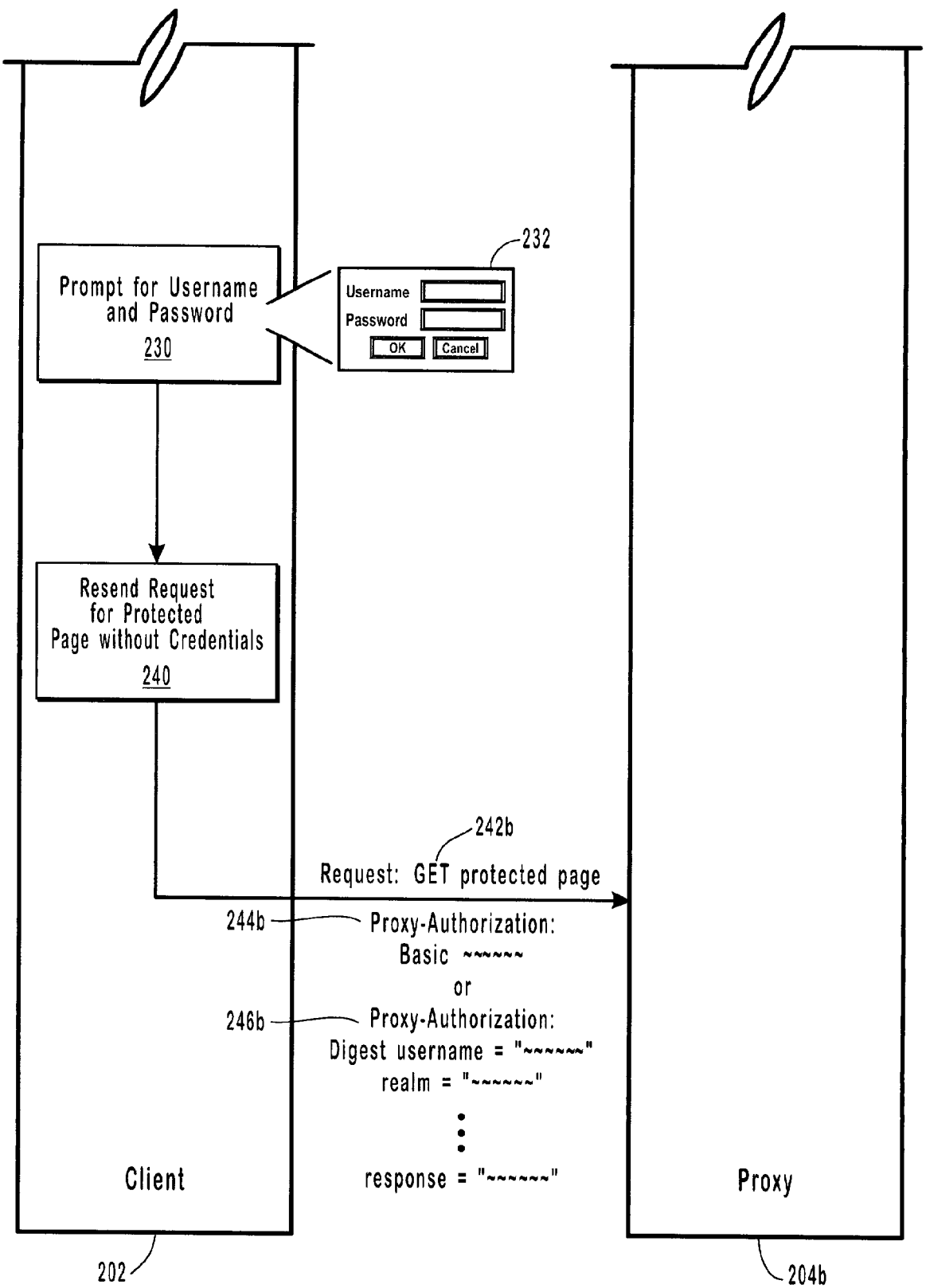

Because the operation of proxies and severs are nearly identical, FIGS. 2B–1 and 2B–2 closely resemble FIGS. 2A–1 and 2A–2. FIGS. 2A–1 and 2A–2 show the operation of a proxy system 204b in challenging a client system 202 for authentication. To aid in comparing FIGS. 2A–1 and 2A–2 with FIGS. 2B–1 and 2B–2, like aspects have been similarly numbered. Although proxy authentication is nearly identical to server authentication, it should be noted that proxy authentication is not related to whether or not the page requested from a server is protected. For server authentication, the server verifies that a requester is authorized to access a resource provided by the server, such as a document, email, database, etc. In contrast, for proxy authentication, the proxy verifies that a requestor is authorized to use the resources of the proxy. In other words, the proxy verifies that the client is authorized to have the proxy make requests on the client's behalf. To emphasize why proxies and servers differ, it should be apparent that a client's authorization to access a document at a particular server does not necessarily imply that the client is authorized to have a proxy request the document for the client. Likewise, a client's authorization to have a particular proxy request documents on the client's behalf does not necessarily imply that the client is authorized to access a document at a server.

At reference 210, client 202 requests 212 a page (protected or not) from a server without providing proxy authorization credentials. Proxy 204b receives the request 212 that is to be performed on the behalf of client 202 and checks the permissions (220) required for client 202 to use proxy 204b. The response 222b indicates a status code indicating that proxy authentication is required. For proxies, the value of the status code is 407. HTTP headers 224b and 226b specify the type of authentication required. (Either or both of header 224b and header 226b will be included with response 222b, depending on the type of authentication supported by proxy 204b.) For proxy authentication, headers 224b and 226b are "Proxy-Authenticate:" headers. The directives described above with reference to headers 224a and 226a apply to both proxies and server and therefore will not be repeated here.

After receiving response 222b, as illustrated at reference 230 in FIG. 2B–2, client 202 prompts 232 for username and password. The realm and name for proxy 204b generally are included with the prompt, although they are not shown with prompt 232. Having obtained the required credentials, at reference 240 the client is prepared for resending the request for the page, but this time the request 242b will include the proxy authorization credentials with the request. Usually, only one of either HTTP header 244b or header 246b will be included with request 242b, depending on the type of authentication supported by client 202 and proxy 204b. For proxy authentication, headers 244b and 246b are "Proxy-Authorization:" headers. As with headers 224b and 226b, the directives described above with reference to headers 244a and 246a apply to both proxies and servers and therefore will not be repeated here.

Figure 3A:
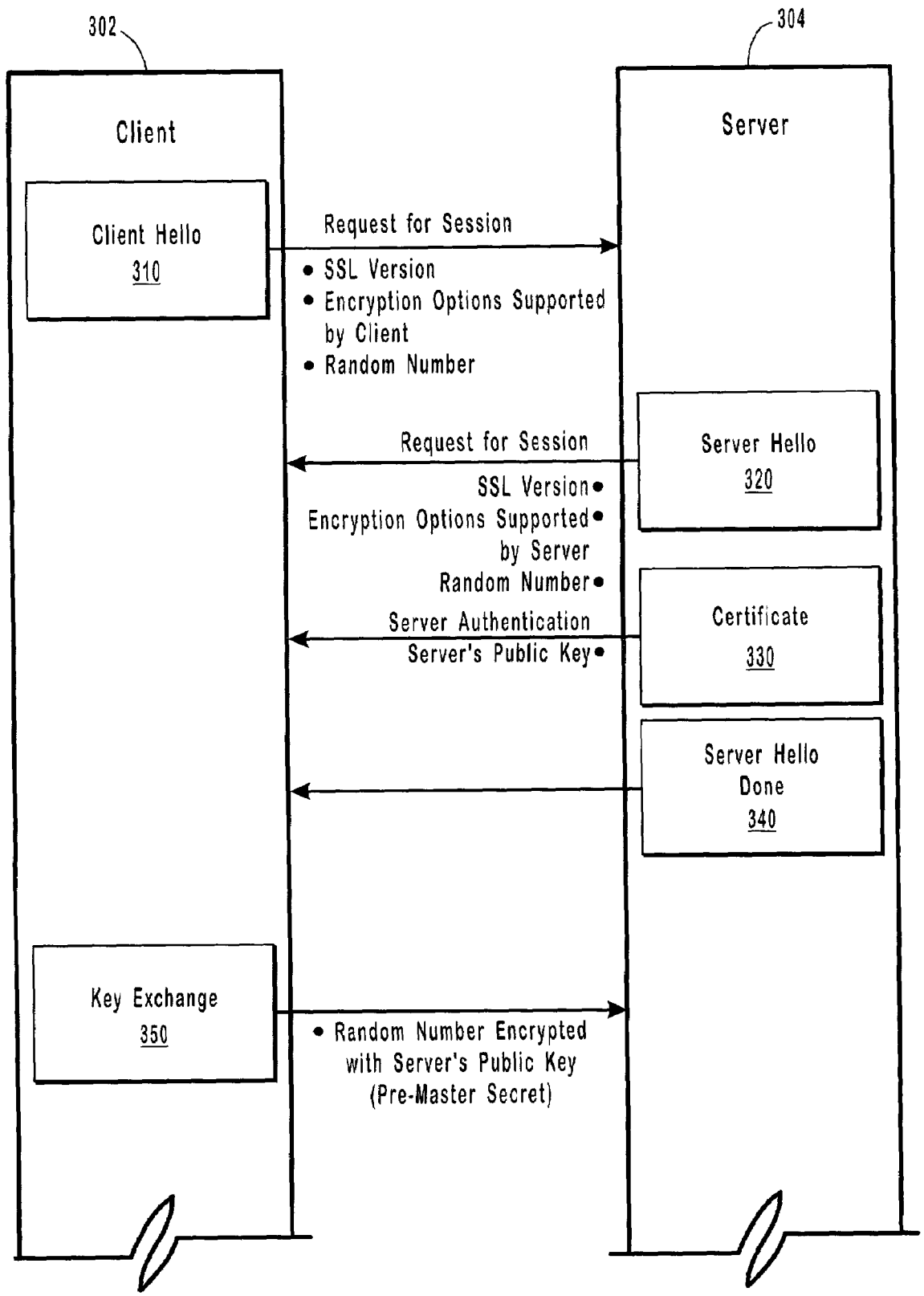
FIGS. 3A and 3B portray the handshaking that occurs in negotiating a secure connection between a client and a server.
Figure 3B:
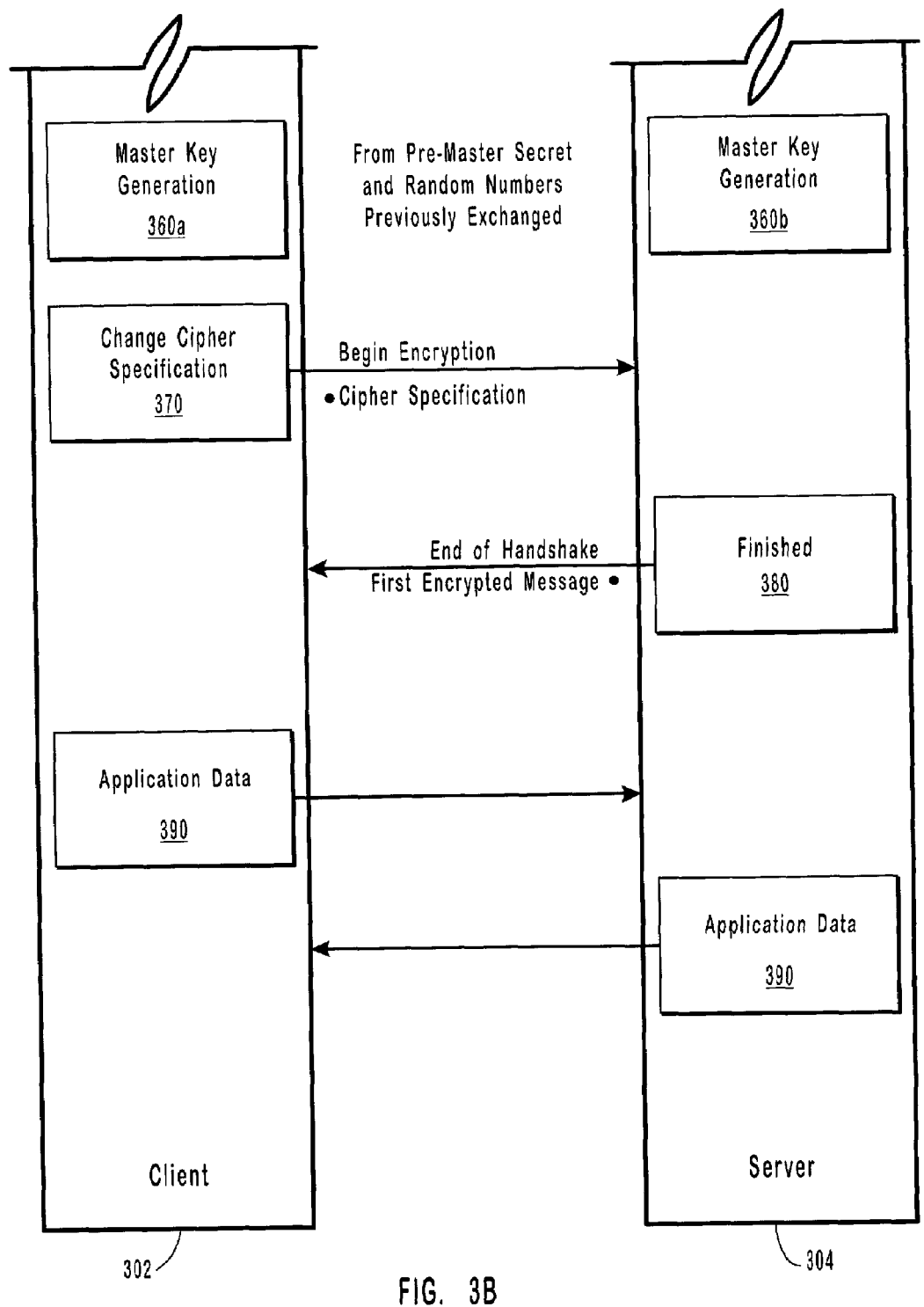

FIGS. 3A and 3B portray the handshaking that occurs in negotiating a secure sockets layer ("SSL") connection between a client 302 and a server 304. In accordance with the present invention, server 304 should be understood to include both server systems and proxy systems. The client 302 first sends client hello 310 to server 304. Client hello 310 is a request for a secure session and includes the client's SSL version, the encryption options supported by the client, and a random number. In response, server 304 sends server hello 320 to client 302. Similar to client hello 310, server hello 320 includes the server's SSL version, the encryption options supported by the server, and a random number. Then, the server's certificate 330, containing the server's public key so the client can authenticate server 304, is sent to client 302. A certificate also contains information about the certificate holder, such as name and address. The information is referred to as the certificate holder's distinguished name. The private key of a trusted organization, known as a certifying authority ("CA"), signs the certificate. Then, using the public key of the CA, anyone with a copy of the signed certificate can decrypt the copy to obtain the distinguished name and public key. By signing a certificate in this way, the trusted CA vouches that the public key belongs to the organization identified by the distinguished name. Although not shown, the server may request a certificate from the client in order to authenticate the client to the server. If the client authenticates to the server using a certificate, there is no need for subsequent basic or digest authenticate challenges because the certificate is sufficient proof of the client's identity. Server hello done 340 indicates to the client that the server hello portion of the handshaking is complete.

With the server's public key, client 302 encrypts a random number and sends it to server 304 in key exchange 350. The random number is called the pre master secret because it is known only to the client and the server. By encrypting the random number with the server's public key, the encrypted pre master secret must be decrypted by the server's private key, known only to the server. Using the pre master secret and the random number previously exchanged, client 302 and server 304 simultaneously generate master keys as shown by references 360a and 360b of FIG. 3B. Client 302 then sends a change cipher specification 370 to server 304 to indicate that future communication should be encrypted using the master keys and identified cipher specification. The server 304 sends finished 380 to conclude the SSL handshake. (Finished 380 is the first message encrypted with the master key.) Client 302 and server 304 then exchange application data 390 that each encrypts with the master key.

Those skilled in the art will recognize that the foregoing descriptions of server authentication, proxy authentication, and the SSL handshake have been abbreviated to show their general underlying concepts. It should be emphasized that these descriptions merely provide representative implementations for negotiating secure connections and for authenticating clients, proxies, and servers. The present invention is not necessarily limited to any particular authentication scheme or secure connection technology.

Note that the present invention may be practiced in a wide variety of embodiments. Therefore, the steps and acts described with reference to FIGS. 4 and 5 depend, at least in part, on the perspective used to view the invention. For example, something sent from the perspective of a client system may be received from the perspective of a server system. In the description that follows, acts or steps described from one perspective or embodiment should not be interpreted as necessarily excluding the present invention from other embodiments. Unless explicitly stated to the contrary, multiple perspectives for practicing the present invention should be considered within the scope of the appended claims.

Figure 4:
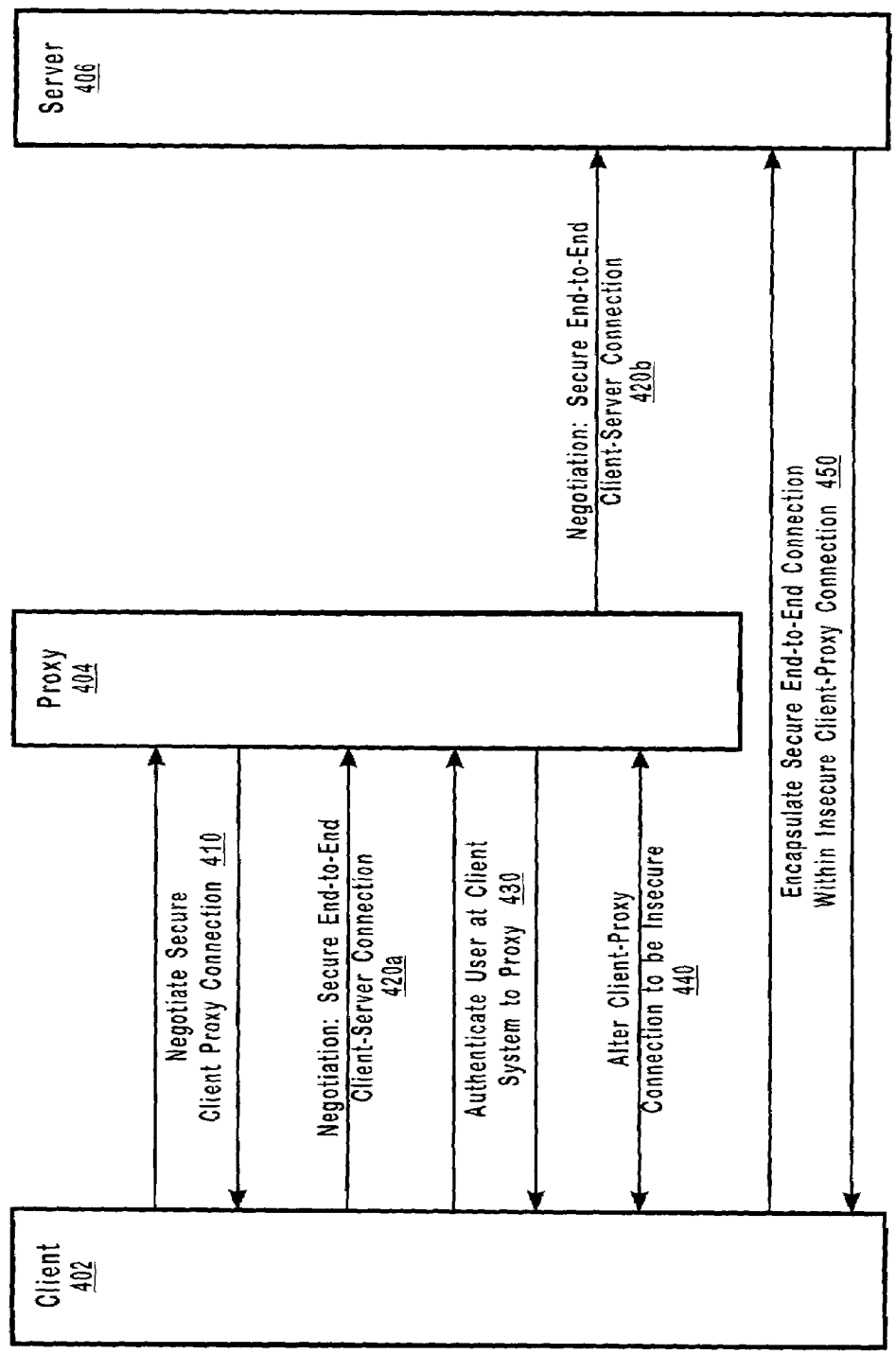
FIG. 4 depicts an exemplary method for negotiating a secure end-to-end connection between a client and a server, using a proxy as an intermediary.

Referring now to FIG. 4, an exemplary method is illustrated for negotiating a secure end-to-end connection between a client system 402 and a server system 406, using a proxy system 404 as an intermediary. Reference 410 shows a step for negotiating a secure connection between client 402 and proxy 404. This step includes acts such as receiving or sending a request for a secure client-proxy connection and establishing the secure client-proxy connection. The secure client-proxy connection may use SSL, TLS, wireless TLS, ("WTLS"), secure HTTP ("S-HTTP"), point-to-point tunneling protocol ("PPTP"), layer two tunneling protocol ("L2TP"), IP security ("IPsec"), or any other secure protocol/implementation. An act of proxy 404 sending a certificate to client 402 and an act of client 402 receiving a certificate from proxy 404 may be included within the step for negotiating a secure client-proxy connection. The certificate allows the identity of proxy 404 to be verified. Reference 420a marks the initiation of a step for negotiating a secure end-to-end connection between client 402 and server 406. The step for negotiating a secure end-to-end connection may include the acts of client 402 sending a request to proxy 404 for the secure end-to-end connection and proxy 404 receiving the request. Here as well, the secure end-to-end connection may use SSL, TLS, WTLS, S-HTTP, PPTP, L2TP, IPsec, or some other protocol/implementation.

A step for authenticating a user at client 402 to proxy 404 is indicated at reference 430. The step for authenticating may include acts such as proxy 404 issuing an authenticate challenge, client 402 receiving an authenticate challenge, client 402 sending proper authentication credentials to proxy 404, and proxy 404 receiving proper authentication credentials back from client 402. The step for authenticating a user may include HTTP basic authentication, HTTP digest authentication, or some other type of authentication, such as authentication based on a client certificate that is exchanged at the time a secure client-proxy connection is established. If a client certificate is used for authentication, there is no need for separate HTTP basic authentication or HTTP digest authentication. Once the client is authenticated, the client and proxy perform the step of altering the secure client-proxy connection to be insecure, as shown at reference 440. The client-proxy connection can be made insecure by performing the act of setting the encryption used by the connection to a null cipher.

The step for negotiating a secure end-to-end connection between client 402 and sever 406 continues at reference 420b. With the client having been authenticated, the proxy 404 performs the act of forwarding the request for a secure end-to-end connection to the server 406. Finally reference 450 shows a step for encapsulating the secure end-to-end connection within the now insecure client-proxy connection. This means that the client and proxy do not establish a separate connection for exchanging data that is part of the secure end-to-end connection.

Server authenticate challenges issued by server 406 and received by client 402, authentication responses sent from client 402 and received by server 406, and other data exchanged or transferred between client 402 and server 406, travel through the insecure client-proxy connection. (If client 402 authenticates to server 406 with a certificate that is exchanged as part of establishing a secure end-to-end connection, no separate authentication challenges or responses are necessary.) However, since a secure end-to-end connection exists between the client 402 and server 406, the data passing through the insecure client-proxy connection is secure. By encapsulating the secure end-to-end connection within the insecure client-proxy connection, the overhead associated with establishing a separate connection is avoided. Furthermore, because the insecure client-proxy connection does not perform any encryption, the overhead of encapsulating the secure end-to-end connection within the insecure client-proxy connection is minimal.

Figure 5:
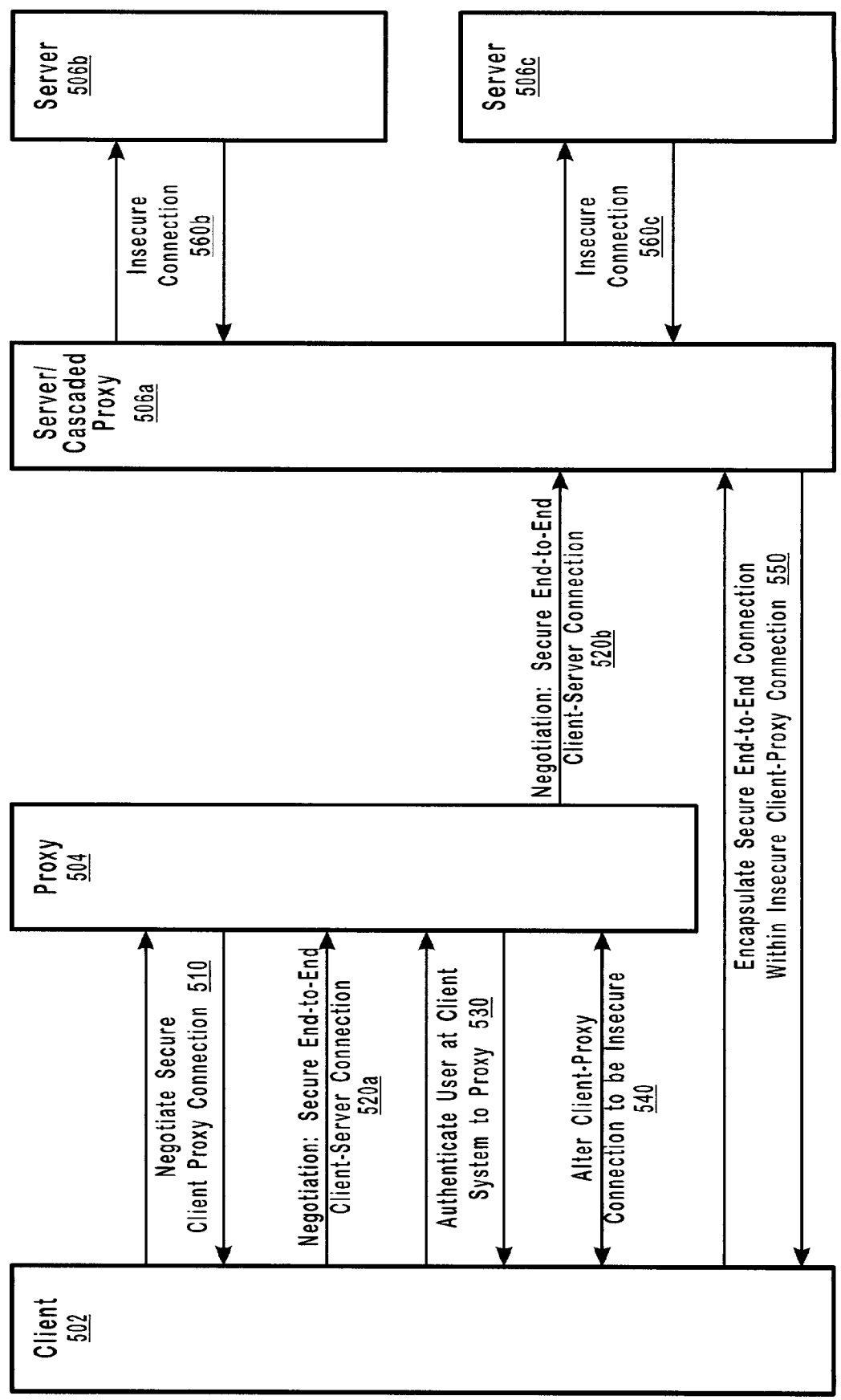
FIG. 5 illustrates an exemplary method for negotiating a secure end-to-end connection between a client and a server or cascaded proxy, using a proxy as an intermediary.

Turning next to FIG. 5, identifying server or cascaded proxy 506a as either a "server" or a "cascaded proxy" emphasizes that server or cascaded proxy 506a may be the source or origin of data, or may operate as a proxy in accessing the source or origin of data. The actual number and arrangement of proxy systems and/or cascaded proxy systems is not necessarily limited by the present invention. In general, with each new secure end-to-end connection, an existing intermediate end-to-end connection no longer needs to be secure and may be downgraded to an insecure connection. The new secure end-to-end connection is then encapsulated within the existing intermediate end-to-end connection.

In particular, FIG. 5 illustrates an exemplary method for negotiating a secure end-to-end connection between a client system 502 and a server or cascaded proxy system 506a, using a proxy system 504 as an intermediary. As already noted, server or cascaded proxy system 506a may be the source/origin of data or may operate as a proxy in accessing other servers, such as server 506b and server 506c. For example, server or cascaded proxy system 506a may be at the edge of a secure network, with insecure connection 560b to server 506b and insecure connection 560c to server 506c being inside the secure network. External communication with the secure network occurs through server or cascaded proxy 506a. This arrangement may prove beneficial where server 506b and/or server 506c do not support secure end-to-end connections, but nevertheless need to be accessed from outside the secure network. In this case, server or cascaded proxy 506a provides the necessary security for external access.

Due to similarities between the steps and acts of FIG. 5 and the steps and acts of FIG. 4, portions of the foregoing description may be somewhat abbreviated. However, FIG. 5 will be described from the perspective of client 502, wherever appropriate. Reference 510 shows a step for negotiating a secure connection between client 502 and proxy 504. This step includes acts such as sending a request for a secure client-proxy connection and establishing the secure client-proxy connection through a secure communication protocol. An act of proxy 504 sending a certificate to client 502 and an act of client 502 receiving a certificate from proxy 504 may be included within the step for negotiating a secure client-proxy connection. As indicated above, the certificate allows the identity of proxy 504 to be verified. Reference 520a marks the initiation of a step for negotiating a secure end-to-end connection between client 502 and server or cascaded proxy 506a. The step for negotiating a secure end-to-end connection may begin with the act of client 502 sending proxy 504 a request for the secure end-to-end connection.

A step for authenticating a user at client 502 to proxy 504 is indicated at reference 530. The step for authenticating includes acts such as the client 502 receiving an authenticate challenge and sending proper authentication credentials to proxy 504. The step for authenticating a user may include HTTP basic authentication, HTTP digest authentication, or some other type of authentication, such as authentication based on a client certificate that is exchanged at the time a secure client-proxy connection is established. If a client certificate is used for authentication, there is no need for separate HTTP basic authentication or HTTP digest authentication. Once the client is authenticated, the client and proxy perform the step of altering the secure client-proxy connection to be insecure, as shown at reference 540. For example, the client-proxy connection can be made insecure by performing the act of setting the encryption used by the connection to a null cipher.

The step for negotiating a secure end-to-end connection between client 502 and sever or cascaded proxy 506a continues at reference 520b. With the client having been authenticated, the proxy 504 performs the act of forwarding the request for a secure end-to-end connection to the server or cascaded proxy 506a. Finally, reference 550 shows a step for encapsulating the secure end-to-end connection within the now insecure client-proxy connection. This means that the client and proxy do not establish a separate connection for exchanging data that is part of the secure end-to-end connection.

Authenticate challenges issued by server or cascaded proxy 506a, authentication responses from client 502, and data exchanged between client 502 and server or cascaded proxy 506a, travel through the insecure client-proxy connection. (Note that if client 502 authenticates to server 506 with a certificate that is exchanged as part of establishing a secure end-to-end connection, no separate authentication challenges or responses are necessary.) However, since a secure end-to-end connection exists between the client 502 and server or cascaded proxy 506a, the data passing through the insecure client-proxy connection is secure. As noted with respect to FIG. 4, by encapsulating the secure end-to-end connection within the insecure client-proxy connection, the overhead associated with establishing a separate connection is avoided. Furthermore, because the insecure client-proxy connection does not perform any encryption, the overhead of encapsulating the secure end-to-end connection within the insecure client-proxy connection is minimal.

Those of skill in the art will recognize that the present invention accounts for managing security on a connection-by-connection (or hop-by-hop) basis. As secure end-to-end connections are established, any intermediate secure connections may be downgraded to be insecure. For example, if client 502 establishes a secure end-to-end connection with server 506c, that connection may be encapsulated into the secure connection previously established between client 502 and server or cascaded proxy 506a. Once the secure end-to-end connection is in place between client 502 and server 506c, the secure connection between client 502 and server or cascaded proxy 506a may be downgraded.

Identifying server or cascaded proxy 506a as either a "server" or a "cascaded proxy" emphasizes that server or cascaded proxy 506a may be the source or origin of data, and/or may operate as a proxy is accessing the source or origin of data. The actual number and arrangement of proxy systems, cascaded proxy systems, and/or server systems is not necessarily limited by the present invention. In general, with each new secure end-to-end connection, existing intermediate end-to-end connections no longer need to be secure and may be downgraded to insecure connections. The new secure end-to-end connection is then encapsulated in the existing intermediate end-to-end connection without imposing substantial overhead.

Note that the present invention does not impose an exact order on the claimed steps and acts. Many of the steps and acts may be performed in a variety of sequences, but the authentication credentials are exchanged over secure connections. Moreover, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In computer network interconnecting a client system, a proxy system, and a server system, wherein data exchanged over the computer network is subject to being compromised, a method of negotiating, through the proxy system, a secure end-to-end connection between the client system and the server system, wherein the client system securely authenticates to the proxy system, the method comprising the acts of:

receiving a request from the client system for a secure connection between the client system and the proxy system;

establishing a secure connection between the client and proxy systems, in which at least the client is authenticated to the proxy system; receiving a request from the client system for a secure end-to-end connection with the server system;

upon authenticating the client, downgrading the secure connection between the client and the proxy systems to an insecure client-proxy connection;

forwarding the client system request for a secure end-to-end connection to the server system only after authenticating the client and upon downgrading the secure connection between the client and the proxy systems to an insecure client-proxy connection, such that the secure connection between the client and the proxy systems is downgraded to an insecure client-proxy connection prior to establishing the secure end-to-end connection between the client and server systems, and such that the secure end-to-end connection is encapsulated within the insecure client-proxy connection, and such that the proxy server does not encrypt or decrypt any data sent between the client and the server within the insecure client-proxy connection.

2. A method as recited in claim 1 further comprising the acts of:
    issuing an authenticate challenge to the client system; and
    receiving, over the secure client-proxy connection, proper authentication credentials from the client system.

3. A method as recited in claim 2 wherein the authenticate challenge issued to the client system is one of a basic and a digest authenticate challenge.

4. A method as recited in claim 1 wherein at least one of the secure client-proxy connection and the secure end-to-end connection is certificate based.

5. A method as recited in claim 4 wherein at least one of the secure client-proxy connection and the secure end-to-end connection is one of a secure sockets layer and a transport layer security connection.

6. A method as recited in claim 1 further comprising the act of sending a certificate to the client system, wherein the certificate may be used to verify the identity of the proxy system.

7. A method as recited in claim 1 further comprising the act of receiving proper authentication credentials from the client system, wherein the proper authentication credentials received from the client system are certificate based.

8. A method as recited in claim 1 further comprising the act of transferring data between the client system and the server system through the secure end-to-end connection.

9. A method as recited in claim 1 wherein downgrading the secure connection between the client system and the proxy system to be insecure comprises the act of setting the cipher set for the connection to be a null cipher.

10. A method as recited in claim 1 wherein the request for a secure end-to-end connection comprises a hypertext transfer protocol connect request.

11. A method as recited in claim 1 wherein the server system comprises one of a reverse proxy server system and a forward proxy system.

12. A method as recited in claim 1 wherein at least one connection is over the Internet.

13. A method as recited in claim 1 wherein the server system comprises a cascaded proxy system, the server system allowing secure connections, insecure connections, or both secure and insecure connections, with one or more other server systems.

14. In computer network interconnecting a client system, a proxy system, and a server system, wherein data exchanged over the computer network is subject to being compromised, a method of negotiating, through the proxy system, a secure end-to-end connection between the client system and the server system, wherein the client system securely authenticates to the proxy system, the method comprising the acts of:
    sending a request to the proxy system for a secure connection between the client system and the proxy system;
    establishing a secure client-proxy connection between the client and proxy systems, in which at least the client is authenticated to the proxy system;
    sending a request to the proxy system for a secure end-to-end connection with the server system, wherein the proxy system forwards the request to the server system for the secure end-to-end connection only after first authenticating the client and only after first downgrading the secure client-proxy connection to an insecure client-proxy connection, such that the secure connection between the client and the proxy systems is downgraded to an insecure client-proxy connection prior to establishing the secure end-to-end connection between the client and server systems, and such that the secure end-to-end connection is encapsulated within the insecure client-proxy connection, and such that the proxy server does not encrypt or decrypt any data sent between the client and the server.

15. A method as recited in claim 14 further comprising the acts of:
    receiving an authenticate challenge from the proxy system; and
    sending, over the secure client-proxy connection, proper authentication credentials to the proxy system.

16. A method as recited in claim 15 wherein the authenticate challenge received by the client system is one of a basic and a digest authenticate challenge.

17. A method as recited in claim 14 wherein at least one of the secure client-proxy connection and the secure end-to-end connection is certificate based.

18. A method as recited in claim 17 wherein at least one of the secure client-proxy connection and the secure end-to-end connection is one of a secure sockets layer and a transport layer security connection.

19. A method as recited in claim 14 further comprising the act of receiving a certificate from the proxy system, wherein the certificate may be used to verify the identity of the proxy system.

20. A method as recited in claim 14 further comprising the act of sending proper authentication credentials to the proxy system, wherein the proper authentication credentials sent to the proxy system are certificate based.

21. A method as recited in claim 14 further comprising the act of transferring data to the server system through the secure end-to-end connection.

22. A method as recited in claim 14 wherein downgrading to secure connection between the client system and the proxy system to be insecure comprises the act of setting the cipher set fix the connection to be a null cipher.

23. A method as recited in claim 14 wherein the request for a secure end-to-end connection comprises a hypertext transfer protocol connect request.

24. A method as recited in claim 14 wherein the server system comprises one of a reverse proxy server system and a forward proxy server system.

25. A method as recited in claim 14 wherein at least one connection is over the Internet.

26. A method as recited in claim 14 wherein the server system comprises a cascaded proxy system, the server system allowing secure connections, insecure connections, or both secure and insecure connections, with one or more other server systems.

27. In computer network interconnecting a client system, a proxy system, and a server system, wherein data exchanged over the computer network is subject to being compromised, a method of negotiating, through the proxy system, a secure end-to-end connection between the client system and the server system, wherein the client system securely authenticates to the proxy system, the method comprising steps for:
    negotiating a secure client-proxy connection between the client and proxy systems, in which least client is authenticated to the proxy system;
    downgrading the secure client-proxy connection to an insecure client-proxy connection alter authenticating the client;
    only after authenticating the client and after downgrading the secure client-proxy connection, negotiating a secure end-to-end connection between the client and the server system using the secure client-proxy connection, such that the secure connection between the client and the proxy systems is downgraded to an insecure client-proxy connection prior to establishing the secure end-to-end connection between the client and server systems, and such that the secure end-to-end connection is encapsulated within the insecure client-proxy connection, and such that the proxy server does not encrypt or decrypt any data sent between the client and the server.

28. A method as recited in claim 27 further comprising a step for authenticating the client system to the proxy system, wherein the step for authenticating comprises an act of either the client system sending or the proxy system receiving, proper authentication credentials including at least one of a basic authenticate challenge response, a digest authenticate challenge response, and a certificate.

29. A method as recited in claim 27 wherein the step for negotiating a secure connection between the client and proxy systems comprises the act of the client system receiving or the proxy system sending a certificate, wherein the certificate may be used to verify the identity of the proxy system.

30. A method as recited in claim 27 wherein at least one of the secure client-proxy connection and the secure end-to-end connection is certificate based.

31. A method as recited in claim 30 wherein at least one of the secure client-proxy connection and the secure end-to-end connection is one of a secure sockets layer and a transport layer security connection.

32. A method as recited in claim 27 wherein the step for altering the secure client-proxy connection comprises the act of setting the cipher set for the connection to be a null cipher, thereby downgrading the client-proxy connection to be insecure.

33. A method as recited in claim 27 where the step for negotiating a secure end-to-end connection comprises the act of either the client system sending or the proxy system receiving a hypertext transfer protocol connect request.

34. A method as recited in claim 27 wherein the server system comprises a cascaded proxy system, the server system allowing secure connections, insecure connections, or both secure and insecure connections, with one or more other server systems.

35. In computer network interconnecting a client system, a proxy system, and a sewer system, wherein data exchanged over the computer network is subject to being compromised, a computer program product far implementing a meted of negotiating, through the proxy system, a secure end-to-end connection between the client system and the server system, wherein the client system securely authenticates to the proxy system, comprising:
 a computer readable medium for carrying machine-executable instructions for implementing the method recited in claim 1.

36. A computer program product as recited in claim 35, the method comprised further of machine-executable instructions for performing the acts of:
 issuing an authenticate challenge to the client system; and
 receiving proper authentication credentials from the client system.

37. A computer program product as recited in claim 36 wherein the authenticate challenge issued to the client system is one of a basic and a digest authenticate challenge.

38. A computer program product as recited in claim 36, the method comprised further of machine executable instructions for performing the act of sending a certificate to the client system, wherein the certificate may be used to verify the identity of the proxy system.

39. A computer program product as recited in claim 36 wherein at least one of the secure client-proxy connection and the secure end-to-end connection is certificate based.

40. A computer program product as recited in claim 39 wherein at least one of the secure client-proxy connection and the secure end-to-end connection is one of a secure sockets layer and a transport layer security connection.

41. A computer program product as recited in claim 35, the method further comprised of machine-executable instructions for performing the act of receiving proper authentication credentials from the client system, wherein proper authentication credentials received from the client system are certificate based.

42. A computer program product as recited in claim 35, to method further comprised of machine-executable instructions for performing the act of transferring data between the client system and the server system through the secure end-to-end connection.

43. A computer program product as recited in claim 35, the method comprised further of machine-executable instructions for performing the act of setting the cipher set for the secure client-proxy connection to be a null cipher, thereby downgrading the client-proxy connection to be insecure.

44. A computer program product as recited in claim 35 wherein the request for a secure end-to-end connection comprises a hypertext transfer protocol connect request.

45. A computer program product as recited in claim 35 wherein the server system comprises one of a reverse proxy server system and a forward proxy server system.

46. A computer program product as recited in claim 35 wherein at least one connection is over the Internet.

47. A computer program product as recited in claim 35 wherein the server system comprises a cascaded proxy system, the sewer system allowing secure connections, insecure connections, or both secure and insecure connections, with one or more other server systems.

48. In computer network interconnecting a client system, a proxy system, and a server system, wherein data exchanged over the computer network is subject to being compromised, a computer program product for implementing a method of negotiating, through the proxy system, a secure end-to-end connection between the client system and the server system, wherein the client system securely authenticates to the proxy system, comprising:
 a computer readable medium for carrying machine-executable instructions for implementing the method recited in claim 14.

49. A computer program product as recited in claim 48, the method comprised further of machine-executable instructions for performing the acts of:
 receiving an authenticate challenge from the proxy system; and
 sending proper authentication credentials to the proxy system.

50. A computer program product as recited in claim 49 wherein the authenticate challenge received by the client system is one of a basic and a digest authenticate challenge.

51. A computer program product as recited in claim 48, the method comprised further of machine-executable instructions for performing the act of receiving a certificate from the proxy system, wherein the certificate may be used to verify the identity of the proxy system.

52. A computer program product as recited in claim 48 wherein at least one of the secure client-proxy connection and the secure end-to-end connection is certificate based.

53. A computer program product as recited in claim 52 wherein at least one of the secure client-proxy connection and the secure end-to-end connection is one of a secure sockets layer and a transport layer security connection.

54. A computer program product as recited in claim 48, the method comprised further of machine-executable instructions for performing the act of sending proper authentication credentials to the proxy system, wherein the proper authentication credentials sent to the proxy system are certificate based.

55. A computer program product as recited in claim 48, the method comprised further of machine-executable instructions for performing the act of transferring data between the client system and the server system through the secure end-to-end connection.

56. A computer program product as recited in claim 48, the method comprised further of machine-executable instructions for performing the act of setting the cipher set for the secure client-proxy connection to be a null cipher, thereby downgrading the client-proxy connection to be insecure.

57. A computer program product as recited in claim 48 wherein the request for a secure end-to-end connection comprises a hypertext transfer protocol connect request.

58. A computer program product as recited in claim 48 wherein the server system comprises one of a reverse proxy server system and a forward proxy server system.

59. A computer program product as recited in claim 48 wherein at least one connection is over the Internet.

60. A computer program product as recited in claim 48 wherein the server system comprises a cascaded proxy system, the server system allowing secure connections, insecure connections, or both secure and insecure connections, with one or more other server systems.

* * * * *

UNITED STATES PATENT AND TRADEMARK OFFICE
CERTIFICATE OF CORRECTION

PATENT NO. : 6,996,841 B2  Page 1 of 1
APPLICATION NO. : 09/838745
DATED : February 7, 2006
INVENTOR(S) : Kadyk et al.

It is certified that error appears in the above-identified patent and that said Letters Patent is hereby corrected as shown below:

On the Title page, in field (56), under "Other Publications" in column 2, line 1, after "Network World," insert -- Email --.

On the Title page, in field (56), under "Other Publications" in column 2, line 2–3, delete "autehntication of" and insert -- authentication --, therefor.

In column 9, line 13, delete "FIGS." and insert -- FIG. --, therefor.

In column 16, line 34, in Claim 22, delete "to" and insert -- the --, therefor.

In column 16, line 36, in Claim 22, delete "fix" and insert -- for --, therefor.

In column 16, line 59, in Claim 27, after "which" delete "least" and insert -- at least the --, therefor.

In column 16, line 62, in Claim 27, delete "alter" and insert -- after --, therefor.

In column 17, line 44, in Claim 35, delete "sewer" and insert -- server --, therefor.

In column 17, line 46, in Claim 35, delete "far" and insert -- for --, therefor.

In column 17, line 47, in Claim 35, delete "meted" and insert -- method --, therefor.

In column 18, line 14, in Claim 42, delete "to" and insert -- the --, therefor.

In column 18, line 36, in Claim 47, delete "sewer" and insert -- server --, therefor.

Signed and Sealed this

Twenty-eighth Day of July, 2009

JOHN DOLL
*Acting Director of the United States Patent and Trademark Office*